United States Patent Office 3,454,539
Patented July 8, 1969

3,454,539
POLYEPOXIDES
Sylvan O. Greenlee, Lafayette, Ind., assignor, by mesne assignments, to Ciba Limited, Basel, Switzerland, a Swiss corporation
No Drawing. Continuation of application Ser. No. 222,961, Sept. 11, 1962. This application Aug. 11, 1967, Ser. No. 660,138
Int. Cl. C08g 23/04, 30/00
U.S. Cl. 260—79                9 Claims

ABSTRACT OF THE DISCLOSURE

A reaction product of a polymercaptan, for example a polymercaptoacetate or polymercaptopropionate, and an olefin epoxide, for example allyl glycidylether or vinyl 3,4-epoxy-cyclohexane. Said reaction product is useful in coatings, adhesives, potting compounds, and tooling compounds.

---

This is a continuation of application Ser. No. 222,961, filed Sept. 11, 1962 now abandoned.

The present invention relates to polyepoxides and more particularly to a new class of polyepoxides and epoxy resin compositions.

Epoxy resins, despite their somewhat higher cost as compared to many conventional resins, have been finding increasing use in coatings, adhesives, potting compounds, tooling compounds, etc. Their superior resistance to acids and alkali, as compared to many of the conventional resins, their hardness, flexibility, resistance to staining, weather durability and resistance to high temperatures continue to open up new uses for the epoxy resins and continue to make these resins more and more valuable to industry. The generally commercially available polyepoxides used in making epoxy resins, however, have been limited in their utility in that they do not possess the most desirable combination of low viscosity and high functionality for optimum versatility in product formulation. This is particularly true of the highly active terminal and cyclic ring attached types of polyepoxides.

Most commercial polyepoxides are of the glycidyl ether of dihydric phenol type and are in most cases solids or very viscous liquids, having relatively poor miscibility with the commonly used hardeners, making it difficult to obtain uniform dispersion of the hardener at ordinary room temperatures. Also, these polyepoxides possess on the average less than two epoxide groups per molecule, thus substantially limiting their functionality. The available aliphatic polyepoxides of the highly active type are also usually limited to an average functionality of around two or less. Furthermore, the available polyepoxides are also limited in flexibilizing structure, it frequently being necessary in making epoxy resins to introduce flexibilizing character through reactive coupling compounds and through added plasticizers, thus adding to the cost of the final epoxy resin product.

It has now been discovered that by reacting certain polymercaptans with certain olefin containing epoxides, as hereinafter more fully described, novel highly functional polyepoxides are obtained. These versatile new polyepoxides, hereinafter referred to as polythioxyepoxides, may readily include within their chemical structure almost any desired amount of flexibilizing aliphatic structure, thus making it unnecessary to add plasticizers or introduce flexibility through choice of reactive coupling compounds when making conversion systems. Also these new polyepoxides are usually low viscosity liquids readily miscible with conventional epoxy hardeners and capable of reacting with these known epoxide polymerizing catalysts and coupling compounds to form infusible solvent-insoluble materials.

The epoxide resin composition conversion products formed by using the polythioxyepoxides are also novel compositions of the present invention. These epoxide conversion products compare most favorably with the epoxide resin compositions made by using presently generally commercially available polyepoxides. By avoiding the necessity of adding reactive coupling compounds to introduce flexibility or the adding of plasticizers, the difficulties that are encountered through the use of such additives are avoided, such as nonreactive plasticizers tending to bleed out of the final resin conversion product and reactive type plasticizers tending to decrease the solvent resistance of the final resin. Also, the added cost of these materials is avoided. The epoxide conversion products of the present invention are also more versatile in that satisfactory products cover a much broader range of flexible to rigid systems than the conventional epoxide conversion products. These new conversion products have been observed to possess uniquely good electrical properties, such as surprisingly low dissipation factors when compared to commercial epoxide systems.

One of the interesting aspects with respect to the formation of the novel epoxide conversion products of the present invention is that in many instances the reaction between the olefin containing epoxide and the polymercaptan takes place so readily that the polythioxyepoxides may be formed "in situ" as part of the conversion reaction in making the epoxide conversion product. Where this is the case, in making the epoxide conversion resin products of the present invention, it is not necessary to separately prepare the polythioxyepoxide and then blend this with the epoxide polymerizing catalyst or coupling compound. The epoxide polymerizing catalyst or coupling compound, in such instances, can be mixed directly with the olefin epoxide and the polymercaptan in making the epoxide conversion product thus taking full advantage of the extremely low viscositly of the polymercaptan and olefin epoxide in product formulation.

The olefin epoxides suitable for practicing the present invention are those in which the olefin functional group is located in a 5 or 6 member carbon ring or is located in a terminal position in an aliphatic hydrocarbon chain. The olefin group should be separated from the epoxide group by at least 1 carbon and the epoxide group should be of the vicinal type. The preferable olefin epoxides are those containing 1 epoxide group and 1 of the cyclic or terminal olefin groups (referred to hereinafter as active olefins). Compounds containing more than 2 active olefin groups are generally not suitable for practicing the present invention because of excessive activity of mercaptan groups with active olefin groups giving in many instances insolubility without involving the epoxide groups in the reaction. Two or more epoxide groups may be present; however, the viscosity increases and the liquid character of the reaction mixture decreases rapidly as the number of epoxide groups is increased above 1. Accordingly, although compounds having a single epoxide group have generally heretofore been considered unsuitable for use in making epoxide resins, it is generally preferred in practicing the present invention to use olefin epoxides which contain only a single epoxide group.

As a polymercaptan for reaction with the olefin epoxide, one may use any polymercaptan containing 2 or more mercaptan groups which are positioned in the compound no further than 6 carbons from a negative activating group. Examples of negative activating groups are ester (—COO—), alcohol (—OH), sulfide (—S—), ether (—O—), and carbonyl (—CO—). Polymercaptans of this general type may be represented by the general formula R(—SH)$_n$, where $n$ is at least 2, and where R is an $n$-valent organic radical such that at least 2 of the —SH groups are no more than 6 carbon atoms removed from each other or from a negative activating group.

The preferred polymercaptans are the polymercaptoacid esters including the esters of both aliphatic and aromatic polyols, such, for example, as glycerol; 2,2-di-p-hydroxyphenyl propane (Bisphenol-A); and various methylol phenols (phenol-formaldehyde condensates). Of the aliphatic polymercaptoacid esters, the polymercaptoacetates and the polymercaptopropionates are preferred. The alcohol portion of the polymercaptoacid ester, in the order of generally decreasing preference, may be given as pentaerythritols (mono, di and tri-; trihydric alcohols including glycerol, trimethylol propane and trimethylol ethane; partial esters of the polyhydric alcohols such as the pentaerythritols, the triols and the glycols with vegetable oil acids (mono acids such as stearic and linoleic, dimerized and trimerized acids); aromatic polyols, such as dihydric phenols and methylol phenol reins; glycols including ethylene, polyethylene, propylene and polypropylene glycols; starches; castor oil; and polyallyl alcohols.

The polythioxyepoxide compounds of the present invention can be represented by the general formula.

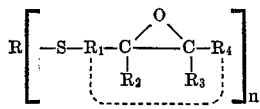

wherein:

$n$ is an integer of 2 or more,

R is an $n$-valent organic radical, $R_1$ is a hydrocarbon, hydrocarbon-ether or hydrocarbonester chain including at least 2 carbon atoms, or an alkyl, aryl or halogen substituted derivative thereof, $R_2$ and $R_3$ are hydrogen, alkyl or halogen, and $R_4$ is hydrogen, halogen, alkyl, aryl, alkyl-aryl, or halogen substituted alkyl, aryl or alkyl-aryl group when not connected to $R_1$, and where $R_4$ is a hydrocarbon chain of 2 to 3 carbon atoms or an alkyl, aryl or halogen substituted derivative thereof when connected to $R_1$.

The reaction between the polymercaptan and the olefin epoxide in obtaining such polythioxyepoxide compounds is illustrated by an example using allyl glycidyl ether and a polymercaptan having the general formula HS—R—SH as follows:

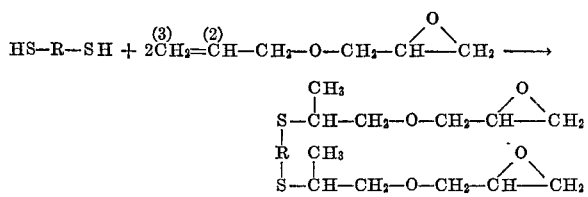

It is understood that the reaction product from such reaction may contain as many as 3 isomers from sulfide linkages at the (2) and (3) positions on the allyl group.

The resulting products in each case have several epoxide groups, the number depending on the number of mercaptan groups per molecule in the polymercaptan used. These epoxide groups react readily with epoxide polymerizing catalyst and coupling reactants. A wide variety of polyepoxides are thus prepared by using different polymercaptans and by using different olefin epoxides. The resulting highly functional polythioxyepoxides are usually mobile liquids possessing excellent miscibility with epoxide polymerizing catalysts and coupling compounds, and with the usual epoxy resin modifying agents such as coal tar residues, petroleum resins, triphenyl phosphite and chlorinated terphenyls. The term "thioxy" as used herein means "containing divalent sulfur as a linkage between carbon atoms."

Various polymercaptans suitable for practicing the present invention are available, some of these being 1,4-butanedithiol; 2,3-dimercaptopropanol; toluene-3,4-dithol; alpha, alpha'-dimercapto-p-xylene, dipentene dimercaptan, and ethylcyclohexyl dimercaptan. Other suitable active polymercaptans are the mercaptoacid esters of polyhydric alcohols (including both aromatic and aliphatic polyols) and mercaptoalcohol esters of polycarboxylic acids. Some of these are available as commercial materials and the preparation of others is illustrated by the following examples, 1 through 14.

The esterifications of the mercaptoaectic acid (MAA), mercaptopropionic acid (MPA) and adipic acid of these examples is carried out in a three-neck flask provided with a mechanical agitator for continuous stirring throughout the reaction period, a heating mantle, a thermometer and a water cooled reflux condenser attached through a water trap for water removal. The esterifications are carried out in the presence of refluxing toluene which serves to blanket the reaction mixture with its vapors and to remove the water of esterification into a water trap. In general the reactions are prolonged until the theoretical amount of water is removed. Viscosities as reported throughout are based on the Gardner Bubble Viscometer. Acid values as reported throughout are determined by titration with alcoholic KOH. Although the term "acid value" is used in connection with the titration of polymercaptans (Examples 1 through 14), it is actually the mercaptan groups which are being titrated, and the equivalent weights calculated therefrom are the mercaptan equivalent weights. The term mol as used in the examples refers to gram mol and the term equivalent refers to gram equivalent when used to denote reaction portions. Chemicals used are of a technical grade. Although a specified amount of toluene is given in a number of the examples, this specified amount is decreased or increased as needed to hold reflux at the indicated temperatures.

EXAMPLE 1.—Mercaptoacetate of triethylene glycol

A reaction mixture of 1 mol triethylene glycol, 4 mols mercaptoacetic acid, and 500 mls. toluene is heated from 25° C. to 124° C. over 1 hour, at 124–140° C. for 1 hour, and at 140–153° C. for 2.5 hours. The mixture is freed of solvent and unreacted materials by distillation, reaching a pot temperature of 150° C. at 1–2 mm. mercury pressure to give a thin liquid residual product of 340 grams having an equivalent weight of 147 (acid value=382) compared to a theoretical value of 155 and a viscosity of A.

EXAMPLE 2.—Mercaptoacetate of 1,4-butanediol

A reaction mixture of 2 mols 1,4-butanediol, 6 mols mercaptoacetic acid, and 500 mls. toluene is heated from 29° C. to 100° C. over 0.5 hour, at 110–120° C. for 2 hours, at 120–138° C. for 2 hours, and at 138–151° C. for 2.5 hours. The mixture is stripped by distillation, reaching a pot temperature of 170° C. at 2 mm. mercury pressure. The residual liquid product of 495 grams has a viscosity of A3 and an equivalent weight of 137 (acid value=411) compared to a theoretical value of 125.

EXAMPLE 3.—Mercaptoacetate of 1,1,1-trimethylol propane

A reaction mixture of 1.5 mols 1,1,1-trimethylol propane 5 mols mercaptoacetic acid, and 600 mls. toluene is heated for 3 hours at 107–140° C. and 2.3 hours at 140–148° C. and stripped to a pot temperature of 173° C. at 3 mm. mercury pressure. The residual liquid (540 g.) has a viscosity of D–E and an equivalent weight of 129 (acid value=435) compared to a theoretical value of 117.

EXAMPLE 4.—Mercaptopropionate of 1,1,1-trimethylol propane

A reaction mixture of 1 mol 1,1,1-trimethylol propane, 4 mols beta mercaptopropionate, and 400 mls. toluene is heated for 4 hours at 118–130° C., for 2 hours at 130–150° C., and for 3.5 hours at 150–155° C. and stripped to a pot temperature of 175° C. at 3 mm. mercury pressure. The residual liquid (409 g.) has a viscosity of F– and will not titrate for acidity with NaOH using phenolphthalein as an indicator. The theoretical equivalent weight to mercaptan group would be 133.

EXAMPLE 5.—Mercaptoacetate of glycerol

A reaction mixture of 1.33 mols glycerol, 5 mols of mercaptoacetic acid, and 400 mls. of toluene is heated for 1 hour at 108–115° C., 4.5 hours at 115–145° C., and 6.75 hours at 145–152° C. and stripped to a pot temperature of 170° C. at 2 mm. mercury pressure. The residual liquid (443 g.) has a viscosity of D–E and an equivalent weight of 120 (acid value=466) compared to a theoretical value of 104.

EXAMPLE 6.—Mercaptoacetate of 1,1,1-trimethylol ethane

A reaction mixture of 1 mol 1,1,1-trimethylol ethane, 3.5 mols mercaptoacetic acid and 92 mls. toluene is heated for 2.5 hours at 115–140° C. and 2.7 hours at 140–153° C. and stripped to a pot temperature of 169° C. at 2 mm. mercury pressure. The residual liquid (350 g.) has a viscosity of E and an equivalent weight of 132 (acid value=426) compared to a theoretical value of 112.

EXAMPLE 7.—Mercaptoacetate of pentaerythritol

A reaction mixture of 0.75 mol pentaerythritol, 3.5 mols mercaptoacetic acid, and 60 mls. toluene is heated 1 hour at 112–134° C., 1 hour at 135–146° C., and 1.5 hours at 146–154° C. and stripped to a pot temperature of 168° C. at 3 mm. of mercury pressure. The residual liquid (337 g.) has a viscosity of R–S and an equivalent weight of 119 (acid value=470) compared to a theoretical value of 108.

EXAMPLE 8.—Mercaptoacetate of a copolymer of allyl alcohol and styrene

The allyl alcohol-styrene copolymer used is a polyol having a softening point of 97° C., a molecular weight of 1150, and an average of 5.2 hydroxyl groups per molecule to give an equivalent weight of 222.

A reaction mixture of 1.5 equivalents of the copolymer, 2 mols mercaptoacetic acid, and 400 mls. toluene is heated 2.5 hours at 101–125° C. and 2.5 hours at 125–160° C. and stripped to a pot temperature of 163° C. at 3 mm. mercury pressure. The residual sticky solid has a viscosity at 50% nonvolatile in dioxane of F an equivalent weight of 312 (acid value=180) compared to a theoretical value of 292.

EXAMPLE 9.—Mercaptoacetate of hydroxylated castor oil

The polyol in this case is a hydroxylated castor oil having an average of 5 hydroxyl groups per molecule.

A reaction mixture of 300 g., 1.5 equivalents of the polyol, 2 mols mercaptoacetic acid, and 200 mls. toluene is heated 2.75 hours at 112–130° C., 2.25 hours at 130–160° C. and 1.75 hours at 160–161° C. and stripped to a pot temperature of 161° C. at 7 mm. of mercury pressure to give a sticky solid having an equivalent weight of 456 (acid value=123).

EXAMPLE 10.—Mercaptoethanol ester of adipic acid

A reaction mixture of 146 g. (1 mol) of adipic acid and 312 g. (4 mols) of mercaptoethanol, with sufficient toluene to give refluxing, is heated for 5 hours at 118–130° C. and 2.5 hours at 130–150° C. followed by vacuum stripping to a pot temperatrure of 157° C. at 20 mm. of mercury pressure to give 220 g. of a semisolid, amber-colored product.

EXAMPLE 11.—Mixed ester of pentaerythritol with mercaptoacetic acid and soya bean oil acids A mixture of 685 g. (2.55 equivalents) of distilled soya bean oil acids, 259 g. (7.2 equivalents) of pentaerythritol and sufficient toluene to give constant reflux at 220° C. is heated to 220° C. and held at this temperature for 3 hours. The heat is removed and 500 mls. toluene added slowly with refluxing to cool to 100° C. The toluene solution is then filtered to recover unreacted pentaerythritol. The benzene-washed, unreacted pentaerythritol is dried, weighed and calculation made to indicate the partial ester composition to retain 5.7 equivalents of the original pentaerythritol, 2.55 equivalents as soya bean oil acid ester and 3.15 equivalents as unreacted hydroxyl content.

To the toluene solution of the partial ester is added 3.5 mols mercaptoacetic acid and the mixture heated for 1 hour at 112–121° C., 1 hour at 121–144° C. and 3.75 hours at 144–146° C. and stripped to a pot temperature of 152° C. at 4 mm. mercury pressure. The residual liquid has a viscosity of W–X and an equivalent weight of 560 (acid value=100).

EXAMPLE 12.—Mixed ester of 1,1,1-trimethylolpropane with mercaptoacetic acid and dimerized soya bean oil acids A mixture of 300 grams (1 equivalent) of the dimerized acid and 134 grams (3 equivalents) of 1,1,1-trimethylol propane with sufficient toluene to give constant reflux is heated at 170–173° C. for 2 hours and at 180–183° C. for 0.5 hour to give the theoretical amount of water from esterification. The reaction mixture is then cooled to 100° C. by slowly adding toluene through the condenser. The mercaptoeacetic acid (200 grams) is then added and the constantly stirred mixture again heated to reflux, removing some toluene along with the water of esterification to let the reaction temperature rise. The temperature is gradually raised from 114° C. to 132° C. over 1 hour, from 132° C. to 145° C. over 1.75 hours, and from 145° C. to 150° C. over 0.5 hour. The toluene and unreacted mercaptoacetic acid is removed by stripping to a pot temperature of 152° C. at 2 mm. mercury pressure. The residual liquid (500 grams) has a viscosity of Z4–Z5 and an equivalent weight of 300 (acid value=187) compared to a theoretical value of 282.

EXAMPLE 13.—Ester of Bisphenol A with mercaptoacetic acid

A mixture of 342 grams (3 equivalents) of Bisphenol A and 552 grams (6 equivalents) of mercaptoacetic acid with sufficient toluene to give constant reflux is heated at 151–156° C. for 7.5 hours and stripped to a pot temperature of 170° C. at 2 mm. of mercury pressure. The residual product (533 grams) has a Durran's softening point of 37° C. and an equivalent weight of 200 (acid value=280) compared to a theoretical value of 188.

EXAMPLE 14.—Ester of a methylolphenol resin with mercaptoacetic acid

A mixture of 330 grams of an acid catalyzed phenol formaldehyde resin having a capillary melting point of 85° C. and a hydroxyl content of 15% by weight and 552 grams (6 equivalents) of mercaptoacetic acid with sufficient toluene to give constant reflux is heated at 146–154° C. for 3.5 hours and stripped to a pot temperature of 170° C. at 2 mm. of mercury pressure. The residual product (532 grams) has a Durran's softening point of 107° C. and an equivalent weight of 228 (acid value=246).

All of the polymercaptans illustrated, both those indicated as being available as well as those the preparation of which is illustrated by the above examples, have at least two or more mercaptan groups which are positioned in the polymercaptan no further than 6 carbon atoms from a negative activating group. Where the negative activating group is a sulfide, the sulfide may be the sulfide in a mercaptan group where the mercaptan groups are not separated by a carbon chain of more than 6 carbon atoms.

The polymercaptan, as previously indicated, is reacted with an olefin epoxide of the type described to produce the novel polythioxyepoxides of the present invention. These polythioxyepoxides contain at least 2 vicinal epoxide groups per molecule. Each epoxide group has attached a carbon chain containing a sulfide group. The sulfide group is removed by at least 2 carbon groups from the epoxide group.

Illustrative of olefin epoxides used in reaction with the polymercaptans in preparing the novel polythioxyepoxides are the allyl epoxyalkyl ethers, allyl substituted aryl epoxyalkyl ethers, allyl epoxyalkyl esters, allyl substituted aryl epoxyalkyl esters, epoxyalkyl arcylates, epoxyalkyl methacrylates, epoxyalkyl 3-butenoates, epoxyalkyl 10-undecenoates, cyclopentenyl epoxyalkyl ethers, cyclopentenyl epoxyalkyl esters, cyclopentenyl substituted aryl epoxyalkyl ethers, cyclopentenyl substituted aryl epoxyalkyl esters and monoepoxides of various diene hydrocarbons such as vinyl cyclohexanes and terpenes. Among olefin epoxides suitable for practicing the present invention that are commercially available are allyl glycidyl ether, limonene monoepoxide, vinyl-3,4-epoxy-cyclohexane, glycidyl acrylate, and allyl-9,10-epoxystearate. The preferred olefin epoxides, in their order of preference, are vinyl-3,4-epoxycyclohexane, allyl glycidyl ether, and 2-allylphenyl glycidyl ether.

Other examples are the glycidyl ethers of 2-allylphenol and ortho-2-cyclopentenylphenol prepared from the phenols and epichlorohydrin in the presence of alkali in accordance with a procedure described in U.S. Patent 2,801,227. In a similar manner a diolefin epoxide is prepared by treating 2,4-diallylphenol with epichlorohydrin. Also, reaction of the allyl ester of 4,4-bis(4-hydroxyphenol) pentanoic acid with 2 mols of epichlorohydrin gives a mono olefin diepoxide.

The polymercaptans react readily with the olefin epoxides in preparing the polythioxyepoxide compositions of the present invention. As the reactions are exothermic and in many instances proceed rapidly at room temperature, care should be taken, particularly when large quantities of the reactants are involved, to take proper precaution in controlling the reaction rate, such, for example, as controlling the mass of reactants, adding one reactant slowly to the other, and cooling the reaction mixture during the reaction to avoid too rapid a reaction rate which might prove dangerous to operating personnel.

The following examples, numbered 16 through 27, illustrate the preparation of some of the new polythioxyepoxides of the present invention. In these examples, one mercaptan group is equivalent to one olefin group. The acid values where given in the examples indicate the remaining acidity of the polymercaptan used and represent primarily unreacted mercaptan groups. Disappearance of acidity during reaction of the mercaptoacetates gives a direct method of following the reaction of the mercaptan group with the olefin group. Reaction of mercaptan groups (in the absence of catalyst) with epoxide groups is found to be negligible at temperatures of up to around 100° C., becoming appreciable at temperatures above 150° C.

EXAMPLE 16.—Glycol dimercaptoacetate and allyl glycidyl ether

In a three-neck flask, provided with a mechanical stirrer, a cooling bath and a heating mantle, is placed 224 grams (2 equivalents) of the dimercaptan and 456 grams (4 equivalents) of the olefin epoxide and with continuous stirring the temperature rapidly rises to 52° C. from exothermic heat, being arrested at this point with external ice-water cooling. The mixture is held at 50–55° C. for 8 hours (using heat after the exotherm has subsided) and then raised to 93° C. over 0.5 hour. The volatile materials are then removed by stripping to a pot temperature of 101°C. at a pressure of 2 mm. of mercury. The liquid epoxide (435 grams) has a viscosity of E, (acid value=8.3) and an epoxide equivalent weight of 237.

EXAMPLE 17.—Glycol dimercaptoacetate and the glycidyl ether of 2-allylphenol

The glycidyl ether of 2-allylphenol has a viscosity of A4–A5 and an epoxide equivalent weight of 195. A mixture of 11.4 grams of the glycidyl ether and 6.3 grams (equivalent amount) of the mercaptan in a vial is allowed to stand for 48 hours at room temperature and then heated for 5 hours at 50° C. to give a liquid product having a viscosity of V, an acid value of 6.9 and an epoxide equivalent weight of 340.

EXAMPLE 18.—Glycol dimercaptoacetate and vinyl-3, 4-epoxycyclohexane

In a flask with continuous stirring a mixture of 105 grams (1 equivalent) of the dimercaptan and 149 grams (1.2 equivalents) of the olefin epoxide is held at 25–30° C. for 4.5 hours (requiring external cooling during first hour) and then vacuum stripped to a pot temperature of 102° C. at 2 mm. mercury pressure to give 224 grams of a liquid having a viscosity of W, an acid value of 3.0 and an epoxide equivalent wieght of 238.

EXAMPLE 19.—Glycol dimercaptoacetate and limonene monoxide

In a flask with continuous stirring a mixture of 52.5 grams (0.5 equivalent) of the dimercaptan and 90 grams (0.6 equivalent) of the olefin epoxide is held at 25–30° C. for 12 hours and then vacuum stripped to a pot temperature of 110° C. and a pressure of 1.5 mm. of mercury. The liquid product of 118 grams has a viscosity of W–, an acid value of 23 and an epoxide equivalent weight of 297.

EXAMPLE 20.—1,4-butanedithiol and vinyl-3,4-epoxycyclohexane

A mixture of 10.0 grams (0.15 equivalent) of the dimercaptan and 40 grams (0.32 equivalent) of the olefin epoxide is allowed to stand at room temperature for 10 hours, heated at 50° C. for 2 hours and at 100° C. for 1 hour and followed by vacuum stripping to a pot temperature of 105° C. at 1 mm. mercury pressure. The resulting liquid (28.4 grams) has a viscosity of H— and an epoxide equivalent wieght of 190.

EXAMPLE 21.—Trimethylol ethane mercaptoacetate and allyl glycidyl ether

A mixture of 20 grams (0.154 equivalent) of the trimercaptan of Example 6 and 17.5 grams (0.154 equivalent) of the olefin epoxide is held by external cooling at 25° C. for 2 hours, for 4.5 hours at 50° C. and stripped to a pot temperature of 102° C. at 2 mm. mercury pressure to give 37.5 grams of a liquid having a viscosity of W, an acid value of 27.2 and an epoxide equivalent weight of 297.

EXAMPLE 22.—Trimethylol propane trimercaptoacetate and mixture of vinyl-3,4-epoxycyclohexane and limonene monoxide In a flask with continuous stirring, a mixture of 65 grams (0.5 equivalent) of the trimercaptan of Example 3, 41.3 grams (0.333 equivalent) of vinyl-3,4-epoxycyclohexane and 25.2 grams (0.166 equivalent) of limonene monoxide exothermed to 60° C. is cooled back to 25° C. and held for 3 hours, heated for 4 hours at 50° C. and stripped to a pot temperature of 110° C. at 2 mm. mercury pressure. The liquid residue (122 grams) has a viscosity of Z6, an acid value of 29.4 and an epoxide equivalent weight of 298.

EXAMPLE 23.—Trimethylol propane trimercaptopropionate and vinyl-3,4-epoxycyclohexane In a flask with continuous stirring, a mixture of 25 grams (0.19 equivalent) of the trimercaptan of Example 4 and 50 grams (0.40 equivalent) of the olefin epoxide exothermed to 50° C. and is held at 50° C. for 5 hours and at 100° C. for 1 hour followed by stripping to a pot temperature of 100° C. at 2 mm. mercury pressure. The liquid residue (48 grams) has a viscosity of Z4 and an epoxide equivalent weight of 330.

EXAMPLE 24.—Glycerol trimercaptoacetate and allyl glycidyl ether

In a flask with continuous stirring, a mixture of 120 grams (1 equivalent) of the trimercaptan of Example 5 and 228 grams (2 equivalents) of allyl glycidyl ether exothermed rapidly to 95° C. is cooled back to 30° C., held at 30–40° C. for 1.5 hours and at 40–65° C. for 0.6 hour followed by stripping to a pot temperature of 80° C. at a pressure of 2 mm. of mercury. The liquid residue (234 grams) has a viscosity of L–M, an acid value of 13 and an epoxide equivalent weight of 241.

EXAMPLE 25.—Trimethylol propane-dimerized soya oil acid ester-mercaptoacetate and vinyl - 3,4 - epoxycyclohexane In a flask with continuous stirring, a mixture of 300 grams (1 equivalent) of the polymercaptan of Example 12 and 150 grams (1.2 equivalents) of the olefin epoxide is held at 25–30° C. for 4 hours (cooling required during first hour), let stand at room temperature for 16 hours and heated at 50–60° C. for 1 hour followed by stripping to a pot temperature of 100° C. at a pressure of 1 mm. of mercury. The liquid residue (415 grams) has a viscosity of Z6, an acid value of 13.8 and an epoxide equivalent weight of 493.

EXAMPLE 26.—Pentaerythritol tetramercaptoacetate and allyl glycidyl ether

In a flask with continuous stirring a mixture of 120 grams (1 equivalent) of the tetramercaptan of Example 7 and 228 grams (2 equivalents) of the olefin epoxide exothermed to 40° C. where it is checked by cooling, held at 20–35° C. for 20 hours, heated at 40–60° C. for 1 hour and stripped to a pot temperature of 82° C. at a pressure of 2 mm. mercury. The liquid residue (227 grams) has a viscosity of U–V, an acid value of 33 and an epoxide equivalent weight of 268.

EXAMPLE 27.—Pentaerythritol tetramercaptoacetate and glycidyl acrylate

In a flask, a mixture of 26 grams (0.217 equivalent) of the tetramercaptan of Example 7 and 50.4 grams (0.434 equivalent) of freshly distilled glycidyl acrylate is mixed and let stand at room temperature for 72 hours followed by stripping to a pot temperature of 118° C. at 1 mm. of mercury. The semisolid residue (76 grams) is dissolved in methyl isobutyl ketone to give a 70% nonvolatile content having a viscosity of G. On the nonvolatile content the acid value is 24.5 and the epoxide equivalent weight is 244. The analysis shows the mercaptan groups to have been essentially reacted and the extra equivalent of glycidyl acrylate to have polymerized as it is not volatile. The residual product is then a mixture of the tetra (thioxyepoxide) and polymerized glycidyl acrylate.

As previously indicated, the highly functional, low viscosity polythioxyepoxides of the present invention make excellent epoxides for reacting with epoxide polymerizing catalysts and coupling compounds for making a wide variety of infusible, solvent-insoluble products. Because of the wide variety of molecular types which can be incorporated into the polythioxyepoxides of the present invention, and thus made available for further reaction with catalyst and coupling reactants, it is possible to vary substantially the final properties of the resulting infusible products into which the polythioxyepoxides have been built.

As previously indicated, it is possible with certain epoxide polymerizing catalyst and coupling compounds to replace the polythioxyepoxide with the ingredients used to synthesize the polythioxyepoxide, namely equivalent amounts of the polymercaptan and the olefin epoxide. This is made possible by the high degree of activity between the polymercaptan and the olefin epoxide which causes these reactants to react with each other in situ forming the polythioxyepoxide which then proceeds to polymerize in the presence of the polymerizing catalyst or to co-polymerize with the coupling compound. Such conversion systems have the advantages of uniquely low viscosities, excellent miscibility with catalyst, couplers and other modifiers, and good economy.

The use of these systems is limited in certain cases in that they can not be used where the catalyst, coupler or other modifier is of such chemical nature as to interfere with the low temperature reaction of the mercaptan group with the olefin group. Contrary to literature reports of basic materials being catalytic to mercaptan addition to olefin groups [J. Chem. Soc. Japan, Ind. Chem. Sect. 57, 169–71 (1954)], it has been found that with the polymercaptans and olefin epoxides of the present invention the addition reaction is often prevented by the presence of aliphatic primary or secondary amines. Accordingly, if such primary or secondary amines are to be used as coupling compounds in making the final epoxide resin, the polythioxyepoxide would be used in the resin reaction rather than the polymercaptan and olefin epoxide. The highly fluid nature of mixtures of epoxide converting agents with the polymercaptans and the olefin epoxides at ordinary temperatures and without solvents make them particularly suitable for formulating solventless coatings and impregnants. High fluidity of these converting mixtures also gives excellent flow into small crevices in potting and adhesive applications. This high fluidity also enables a maximum loading of formulations with metallic powders and other inorganic materials so often desirable in structural plastics. However, because of the exothermic nature of the reaction between the polymercaptan and the olefin epoxide, and the effect of the increase in temperature in increasing reaction rates, in many instances it may be desirable to first make the polythioxy-epoxide composition by reacting the polymercaptan and the olefin epoxide under controlled conditions and then use the polythioxyepoxide in making the final epoxide resin.

The reaction between the polythioxyepoxide and the eyoxide polymerizing catalyst or coupling compound is carried out in the conventional manner of making epoxide resins wherein the catalyst or the coupling compound is blended with the epoxy reactant and the composition then polymerized to set the final resin. Where a highly reactive coupling compound or highly active catalyst is used, the curing may take place at room temperature. Otherwise, heat may be added to complete the cure.

The following general examples illustrate the capacity of the polythioxyepoxides of the present invention to polymerize in the presence of epoxide catalyst and to polymerize with coupling reactants to form infusible epoxide resin materials. As anhydrides and amines are those most generally used as catalysts and coupling reactants in the conversion of epoxides to form infusible epoxide resins, these materials have been used for purposes of illustration. However, the examples are for the purpose of illustration only and the polythioxyepoxides of the present invention may be used with any epoxide converting catalyst or coupling reactant to produce new and useful infusible epoxide resins.

EXAMPLE 28

An approximately 20 gram mixture is prepared containing 1 equivalent of the polythioxyepoxide product of Example 24, 0.85 equivalent of methyl nadic anhydride [methylbicyclo-2.2.1-hept-5-ene-2,3 - dicarboxylic anhydride] and 2,4,6 - tris (dimethylaminomethyl) phenol being 0.5% of the total weight of the mixture. In preparing the mixture the ingredients are weighed into an aluminum dish of 2 inches diameter and heated to dissolve the anhydride. The aluminum dish with its contents is then oven heated for 0.75 hour at 100° C. after which a heat infusible tack-free product is obtained.

EXAMPLE 29

Following the procedure of Example 28 and using the same ingredients in the preparation indicated with the exception that the 0.5% of the amine catalyst is omitted, a tack-free infusible expoxide resin product is obtained after 2 hours heating at 100° C.

EXAMPLE 30

Repeating Example 29, except for using as the polythioxyepoxide the polythioxyepoxide reaction product of Example 22, a tack-free infusible epoxide resin product is obtained after 1 hour heating at 100° C.

EXAMPLE 31

Following the procedure of Example 29, a mixture is prepared containing 1 equivalent of the polythioxyepoxide product of Example 20 and 0.85 equivalent of phthalic anhydride. A tack-free infusible expoxide resin product is obtained after 0.25 hour heating at 125° C.

EXAMPLE 32

Repeating Example 31, except for using as the polythioxyepoxide reaction product of Example 16, a tack-free infusible epoxide resin product is obtained after 0.5 hour heating at 125° C.

EXAMPLE 33

Repeating Example 31, except for using as the polythioxyepoxide a polythioxyepoxide reaction product of Example 18, a tack-free infusible epoxide resin product is obtained after 0.5 hour heating at 125° C.

Samples of this composition heat cured 1 hour at 125° C., 1 hour at 150° C. and 3 hours at 175° C. gives dielectric constants (MIL–I–16923B) of 4.1 at 100 c., 4.1 at 1 kc., 4.0 at 10 kc., and 3.9 at 100 kc.; and dissipation factors (ASTM–D–150) of .003 at 100 c., .006 at 1 kc., 0.12 at 10 kc., and 0.19 at 100 kc.

EXAMPLE 34

Repeating Example 31, except for using as the polythioxyepoxide a polythioxyepoxide reaction product of Example 25 a track-free infusible epoxide resin product is obtained after 0.5 hour heating at 125° C.

EXAMPLE 35

Repeating Example 31 except for using as the polythioxyepoxide a polythioxyepoxide reaction product of Example 24, a tack-free infusible epoxide resin product is obtained after 0.2 hour heating at 125° C.

EXAMPLE 36

A mixture containing equivalent amounts of the dimercaptan of Example 2 and vinyl-3,4-epoxycyclohexane is warmed to 100° C. and then let cool back to 30° C. over 15 minutes. To this is then added the 0.85 equivalent of phthalic anhydride and sufficient of the amine catalyst of Example 28 to equal 0.5% of the total weight. After heating for 1 hour at 125° C., a tack-free infusible epoxide resin product is obtained.

EXAMPLE 37

A mixture containing equivalent amounts of glycol dimercaptoacetate and vinyl-3,4-epoxycyclohexane is heated to 100° C. and then cooled over 15 minutes to 30° C. To this then is added 0.85 equivalent of phthalic anhydride and sufficient of the amine catalyst of Example 28 to equal 0.5% of the total weight. After heating 0.13 hour at 125° C., a tack-free infusible epoxide resin product is obtained.

EXAMPLE 38

A mixture containing equivalent amounts of the trimercaptan of Example 3 and vinyl-3,4-epoxycyclohexane is heated to 100° C. and then cooled over 15 minutes to 30° C. To this is then added 0.85 equivalent of phthalic anhydride and sufficient of the amine catalyst of Example 28 to equal 0.5% of the total weight. After heating 0.5 hour at 125° C. a tack-free infusible product results.

EXAMPLE 39

A mixture of 20 grams of the polymercaptan of Example 13 and 12 grams of vinyl-3,4-epoxycyclohexane is heated for 5 minutes at 100° C., cooled to 30° C. and treated with 9 grams of maleic anhydride and 0.5% of the total weight as the amine catalyst of Example 28. A track-free infusible product results on heating for 0.5 hour at 150° C.

EXAMPLE 40

A mixture of 23 grams of the product of Example 14 dissolved in 23 grams of acetone is mixed with 12 grams of vinyl-3,4-epoxycyclohexane and warmed in a closed container at 50° C. for 2 hours and cooled to 25° C. To this intermediate polyepoxide is added 9 grams of maleic anhydride and 0.22 grams of the amine catalyst of Example 28. A 0.015 inch wet film is allowed to stand 2 hours at 25° C., heated 1 hour at 50° C., 1 hour at 100° C., and 0.5 hour at 150° C. to give a tack-free infusible product.

EXAMPLE 41

A mixture of 20 grams of the polyepoxide of Example 25 and 0.4 gram of 2,4,6-tris (dimethylaminomethyl) phenol is prepared and heated in the manner described in Example 28. After heating 1 hour at 100° C., a tack-free flexible solid infusible epoxide resin product is obtained.

EXAMPLE 42

A mixture of 11.3 grams of the polyepoxide of Example 17 and 1.3 grams of a liquid mixture of diamino benzenes is prepared and heated as in the manner described in Example 27. After heating for 1 hour at 100° C. a tack-free infusible epoxide resin product is obtained.

The polythioxyepoxides of the present invention are particularly suitable for the making of infusible epoxide resins for use as coatings, adhesive, potting compounds and the many other uses which are being found for epoxide resins generally. The polythioxyepoxides are, however, also useful as stabilizers for vinyl chloride resin compositions, the polythioxyepoxides being used generally in amounts of 0.1% to 3.0% of the total weight of halogen containing polymer.

In describing the present invention various specific examples have been given to help illustrate the same. These examples have been given for the purpose of illustration only however, and the invention is not limited thereto.

What is claimed is:
1. The reaction product of a polymercaptan and an olefin epoxide at a temperature not above about 150° C. in which the polymercaptan is a member selected from the group consisting of the polymercaptoacetates, polymercaptopropionates and polymercaptoadipates of a polyol of the class defined by the general formula $R(-SH)_n$ where $n$ is at least 2 and R is a $n$-valent organic radical in which at least two of the —SH groups are no more than 6 carbons removed from a negative activating group selected from the group consisting of esters, alcohols, sulfides, ethers, and carbonyls and in which the olefin epoxide contains at least one vicinal epoxide group separated from an olefin group by at least one carbon, the olefin group being located in a 5 to 6 member carbon ring or in a terminal position on an aliphatic hydrocarbon chain.

2. A reaction product of claim 1 in which the olefin epoxide contains at least one and no more than 2 ring positioned olefin functional groups.

3. A reaction product of claim 2 in which the olefin epoxide contains a single vicinal epoxide group and a single ring positioned olefin functional group.

4. The reaction product of claim 3 in which the olefin epoxide is of the group consisting of vinyl 3,4-epoxycyclohexane, allyl glycidyl ether and 2-allylphenyl glycidyl ether.

5. The reaction product of claim 3 in which the polymercaptan is selected from the group consisting of polymercaptoacetates and polymercaptopropionates.

6. The reaction product of claim 2 in which the olefin epoxide is selected from the group consisting of vinyl 3,4-epoxycyclohexane, allyl glycidyl ether, and 2-allylphenyl glycidyl ether and the polymercaptan is selected from the group consisting of polymercaptoacetates and polymercaptopropionates.

7. The reaction product of an olefin epoxide and a polymercaptan at a temperature not above about 150° C. in which the olefin epoxide has at least one vicinal epoxide group and at least one ring positioned olefin functional group, the olefin functional group being located in a 5 to 6 member carbon ring and separated by at least 1 carbon from a vicinal epoxide group and in which the polymercaptan is a member selected from the group consisting of the polymercaptoacetates, polymercaptopropionates and polymercaptoadipates of a polyol of the class defined by the general formula $R(-SH)_n$ where $n$ is at least 2 and R is a $n$-valent organic radical in which at least two of the —SH groups are no more than 6 carbons removed from a negative activating group selected from the group consisting of esters, alcohols, sulfides, ethers and carbonyls.

8. A reaction product of claim 7 in which the olefin epoxide contains no more than 2 ring positioned olefin functional groups.

9. A reaction product of claim 8 in which the olefin epoxide contains a single vicinal epoxide group and a single ring positioned olefin functional group.

References Cited
UNITED STATES PATENTS
3,248,403    4/1966    Saegebarth   ---------- 260—348

DONALD E. CZAJA, *Primary Examiner.*

M. I. MARQUIS, *Assistant Examiner.*

U.S. Cl. X.R.

260—79.5, 348, 2, 18, 37, 41, 47, 831, 836, 837